United States Patent [19]

Ashbolt

[11] Patent Number: 4,843,930
[45] Date of Patent: Jul. 4, 1989

[54] APPARATUS FOR TRIMMING A TUBULAR ARTICLE

[75] Inventor: Mark T. Ashbolt, Sussex, England

[73] Assignee: MB Group plc, Reading, England

[21] Appl. No.: 201,802

[22] Filed: Jun. 3, 1988

[30] Foreign Application Priority Data

Jun. 3, 1987 [GB] United Kingdom ............... 8713000

[51] Int. Cl.⁴ ............................................. B26D 3/16
[52] U.S. Cl. ......................................... 83/39; 83/54; 83/184; 83/189; 83/276; 83/563; 83/566; 83/569; 83/588; 83/685; 83/686
[58] Field of Search ................... 83/39, 54, 181–184, 83/189, 191, 193, 257, 276, 563, 566, 569, 588, 685, 686, 690; 72/327, 328, 333

[56] References Cited

U.S. PATENT DOCUMENTS

| | | | |
|---|---|---|---|
| 3,091,145 | 5/1963 | Manganelli | 83/39 |
| 3,236,088 | 2/1966 | Moller | 72/328 |
| 3,279,289 | 10/1966 | Wendrizks | 83/569 |
| 3,351,981 | 11/1967 | Rupert | 83/39 |
| 3,359,841 | 12/1967 | Cvacho et al. | 83/54 |
| 3,448,648 | 6/1969 | Magruder et al. | 83/566 |
| 4,022,089 | 5/1977 | Bulso, Jr. et al. | 83/685 |

Primary Examiner—Frank T. Yost
Assistant Examiner—Scott A. Smith
Attorney, Agent, or Firm—Diller, Ramik & Wight

[57] ABSTRACT

The apparatus comprises axially aligned punches 1 and 2 which are operated to cooperate with dies 3 and 4 to trim the flanged ends of a tubular article. The dies are formed in two halves which are opened to allow an article to be positioned at the work station and are then closed around the ends of the article. The punches, dies, and an article delivering mechanism are driven in timed relation from a motor 5.

11 Claims, 5 Drawing Sheets

APPARATUS FOR TRIMMING A TUBULAR ARTICLE

The present invention relates generally to apparatus for trimming the ends of a tubular article which is outwardly flanged at both ends and has particular, but not exclusive, application for trimming the outwardly flanged ends of a plastics body for a food or beverage container, prior to double seaming the flanged ends to a metal end closure.

Our copending United Kingdom application No. 8528119 describes apparatus for trimming an outwardly flanged end of a tubular article but does not address itself to the trimming of both outwardly flanged ends of the article at the high degree of accuracy and speeds demanded by present manufacturing processes.

In the said patent application trimming is effected by relative movement of a punch and die along the axis of the tubular article, the relative movement causing the punch and die to cooperate through the article wall at the flanged end and so to trim the flanged end by a shearing action. The die is required to engage the flanged end at the generally exterior surface of the article, and it is therefore formed as a plurality of segments which can e closed together over the flanged end for the trimming operation, and subsequently opened after trimming to allow the trimmed article to be readily removed.

In the embodiment of FIGS. 6 and 7 of patent application No. 8528119 the die is stationary and the punch is advanced axially into the F1 anged end for trimming. The trimming operation is accompanied by an axial bodily movement of the tubular article, and because the tubular article is rigid and essentially incompressible it is therefore not possible to perform a similar and simultaneous trimming operation upon a flanged end at the other end of the article.

The present invention seeks to provide a method and apparatus which overcomes this difficulty and enables both the outwardly flanged ends of a tubular article to be rapidly and accurately trimmed using segmented dies which are fixed and accurately located in axial position, and using punches which are moved axially in relation to the dies for cooperation therewith.

Accordingly from one aspect the invention provides apparatus for trimming the ends of a tubular article which is outwardly flanged at both ends which comprises for each said flanged end, a die and a punch having respective cutting edges capable of trimming the flanged end to a desired dimension by mutual cooperation through the article wall, the die being comprised of a plurality of segments which are relatively movable between a separated position at which the flanged end may be inserted between them and a closed, die-forming position at which the cutting edge may operatively engage the flanged end at the punch being movable axially of the article when the die is closed, from a retracted position in which it is spaced from the article to an operative position in which it performs the trimming operation on the respective flanged end by cooperation with the die, the said axial movements of the two punches to achieve trimming of the respective flanged ends being each accompanied by an axial movement of the flanged end in the same direction as the punch, and drive means being provided and arranged for operating the punches in timed relation such that the axial movements of the flanged ends are accommodated by sequential and axial bodily movements of the article in opposite directions.

From a second aspect the invention provides a method of trimming the ends of a tubular article which is outwardly flanged at both ends, which comprises:

(a) supporting the article by engagement with its exterior surface between the said flanged ends, so as to leave the flanged ends freely projecting and in such a way that the article is able to undergo limited axial movement along a predetermined path;

(b) closing a respective segmented die around each flanged end by relative movement of the die segments in a plane perpendicular to the said predetermined path, so as to form a cutting edge peripherally engageable with the respective flanged end at the said exterior surface of the article;

(c) advancing a first punch having a cutting edge against one of the flanged ends at the interior surface of the article and, by moving it along said predetermined path, causing it to trim the flanged end to a desired dimension by cooperation of its cutting edge with that of the respective die and to move the flanged end, with the article as a whole, along said predetermined path in the direction of its movement;

(d) retracting the first punch;

(e) advancing a second punch having a cutting edge against the other flanged end at the interior surface of the article and, by moving it along said predetermined path, causing it to trim the other flanged end to a desired dimension by cooperation of its cutting edge with that of the respective die and to return the flanged end, with the article as a whole, along the said predetermined path in the direction opposite to the first said direction of movement; and (f) retracting the second punch and opening the dies to free the article and the trimmed portions of the article therefrom.

An embodiment of the present invention is described below with reference to the accompanying drawings in which.

The apparatus is designed to operate upon the outwardly flanged ends of open-ended and generally cylindrical plastics articles which are destined to form the bodies of packaging containers. One such article A is shown in part in FIG. 3. The apparatus is arranged to trim the flanged ends of successive articles to a desired diameter so that they may make reliable double-seam connections with conventional metal end closures. Typically, the tubular articles are formed of PET (polyethylene terephthalate) and are heat-set to enable them to withstand thermal processing of the containers into which they are to be incorporated.

Figure 1:
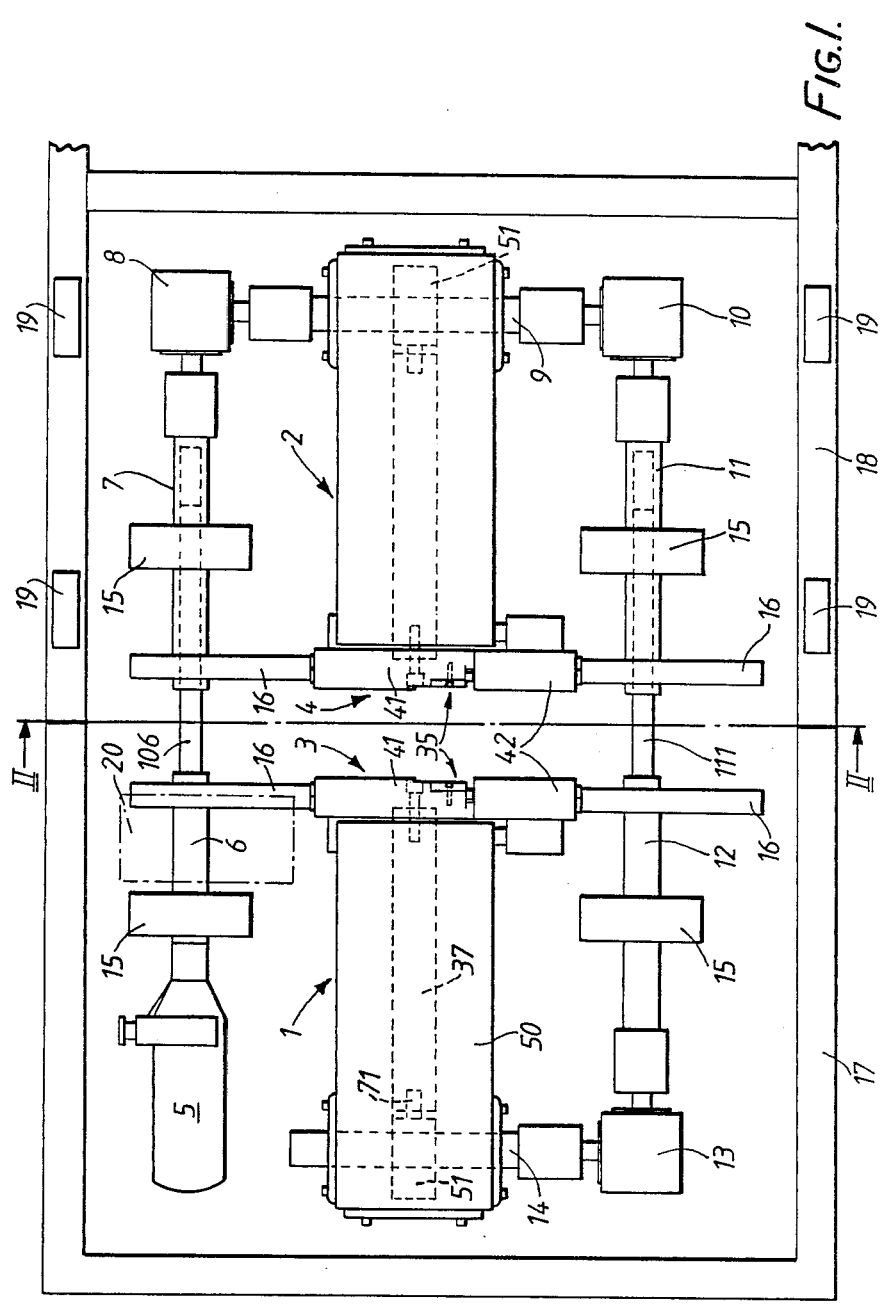
FIG. 1 shows a diagrammatic plan view of an apparatus according to the invention with some parts omitted for the sake of clarity.
Figures 3A, 3B:
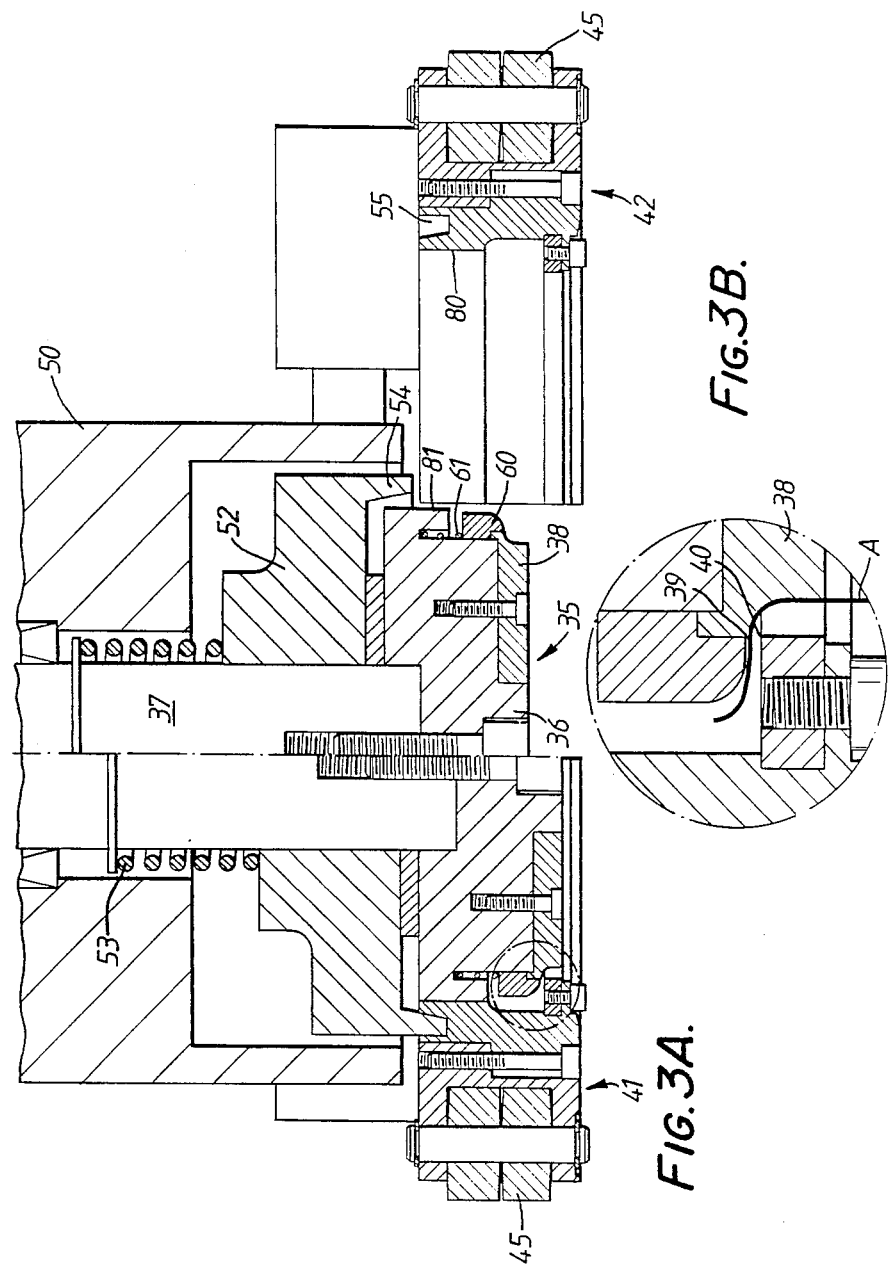
FIG. 3 is a partial cross-section through a punch head and associated die with opposite sides thereof shown in different position of operation.
Figure 4:
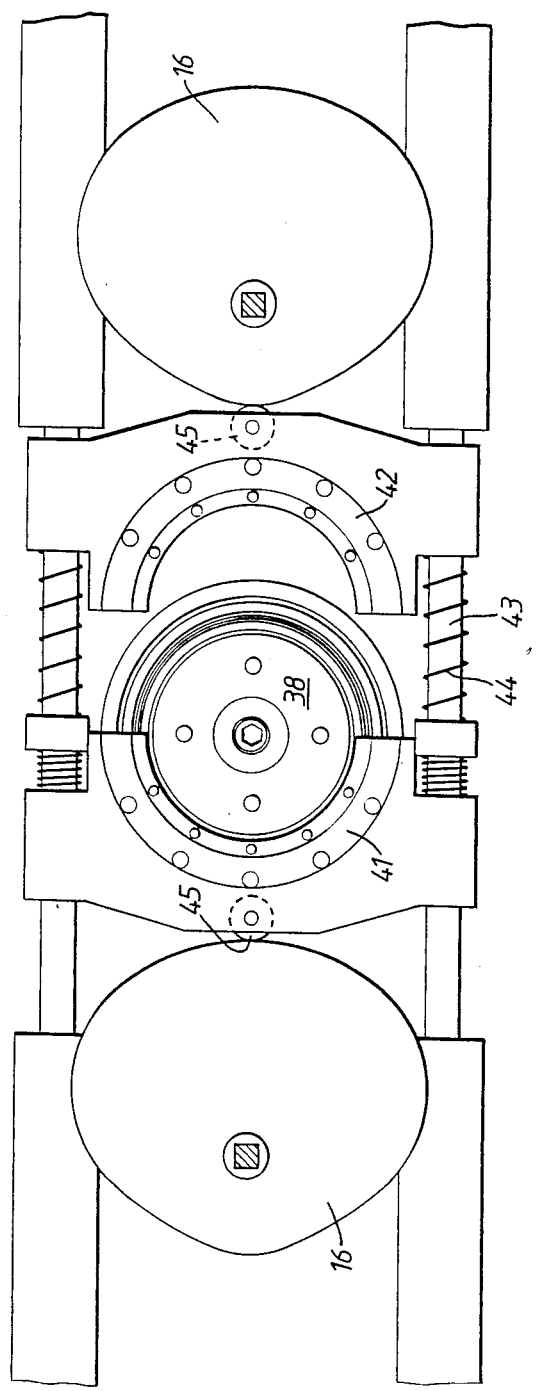
FIG. 4 is an end view of the punch and die shown in FIG. 3 additionally showing the mechanism for closing and opening the die.

Referring to FIG. 1 it can be seen that the apparatus comprises a first punch assembly 1 and a second punch assembly 2 aligned along the central axis of the apparatus. A first die 3 is associated with the punch assembly 1 and a second die 4 is associated with the punch assembly 2. Constructional details of the punch assemblies and the dies are shown in FIGS. 3 and 4.

Figure 5:
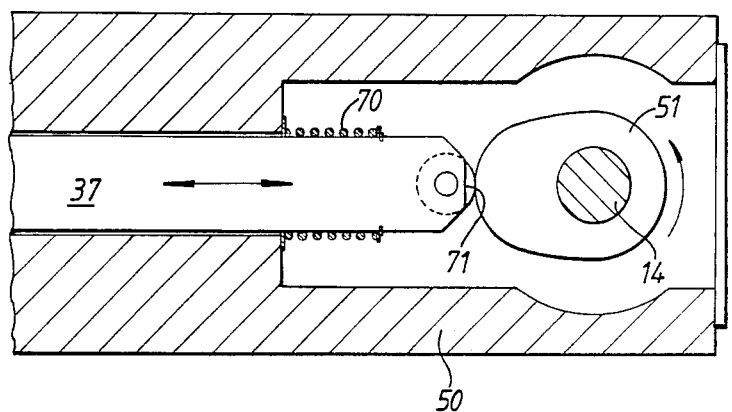
FIG. 5 is an enlarged view, taken partially in section, showing the mechanism for advancing and retracting the punch head.

The drive arrangement for the apparatus is also shown diagrammatically in FIG. 1. Primary drive is provided by a variable speed electric motor having an output shaft 6 telescopically connected to drive shaft 7 by means of a connecting shaft 106 having a non-circular cross-section. Drive shaft 7 is connected through a right-angle drive box 8 to camshaft 9 which is in turn connected through a right-angle drive box 10 to drive shaft 11. Drive shaft 11 is telescopically coupled to a drive shaft 12 by means of a connecting shaft 111 having a non-circular cross-section, and drive shaft 12 is coupled through a right-angle gear box 13 to camshaft 14. The drive shafts are supported in bearings 15 and each carries a die operating cam 16 mounted for rotation therewith and arranged for operating upon respective segments 41, 42 of the dies 3, 4. The camshafts 9, 14 are arranged to drive the punches 35 of the punch assemblies 2, 1 respectively by means of cam following rollers 71 and associated longitudinally movable shafts 37. As can readily be understood from FIG. 5, compression springs 70 acting on the shafts 37 bias the cam rollers against the cam surfaces and bias the punches towards their retracted positions.

In FIG. 1, the dies 3 and 4 are shown with segments 41 in the closed position and segments 42 in the open position. In practice of course, the die segments 41 and 42 will be opened and closed together.

As shown diagrammatically in FIG. 1 the apparatus is mounted on a main frame 17. The second punch assembly 2 with its associated die 4 and drive elements is mounted on a sub-frame 18 which is movable along the central axis of the apparatus on the main frame 17 by means of rollers 19 to allow the apparatus to be adjusted for trimming articles of different lengths.

Figure 2:
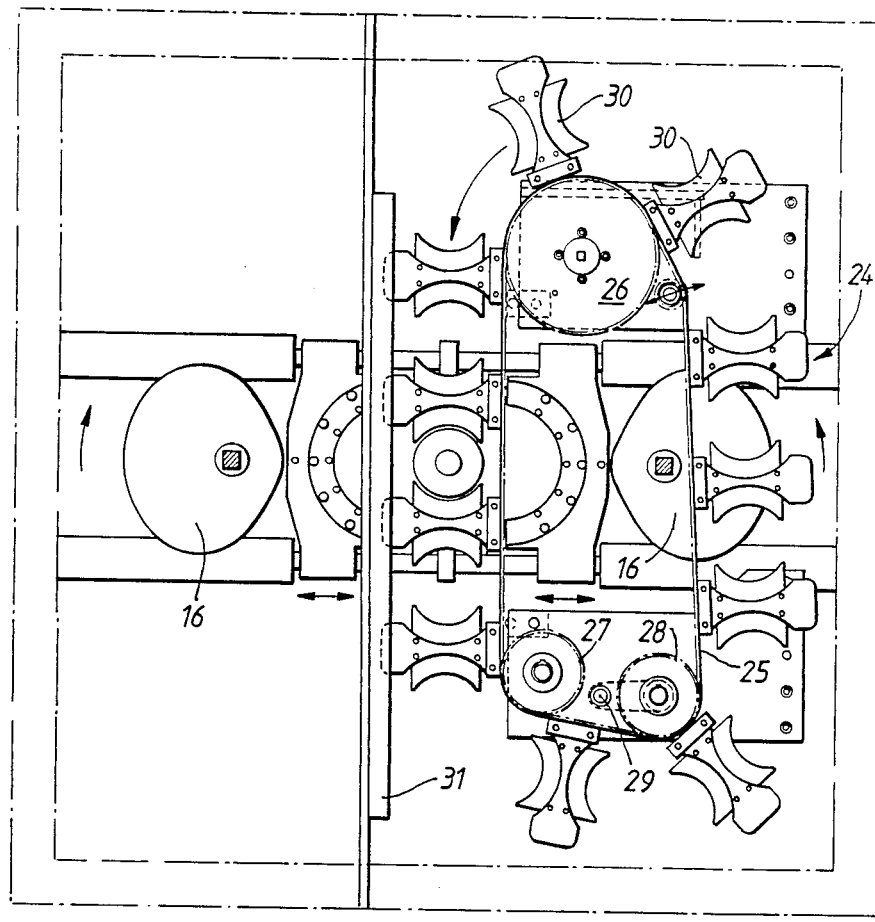
FIG. 2 shows a diagrammatic cross-section through the apparatus along the line II—II of FIG. 1.

FIG. 2 shows a conveyor 24 arranged for delivering the tubular articles or workpieces to the work station of the apparatus at which they are in axial alignment with the two punch assemblies. The conveyor 24 comprises an elongate flexible belt 25 driven around pulley wheels 26, 27 and 28. Pulley wheel 28 is belt driven from an input shaft 29 which in turn is driven from an indexing drive box 20 shown in phantom in FIG. 1. The indexing drive box 20 is itself driven from the output shaft 6 of the electric motor 5. A plurality of holders 30 are spaced along the belt 25 and in a downward run of the conveyor (shown in the centre of FIG. 2), the holders 30 are guided by a guide 31 and cooperate in pairs to support the articles to be trimmed and to deliver them one at a time to the work station. The conveyor is driven in indexing motion from the indexing drive box 20 to move the articles into position at the work station when the dies are in the open position shown in FIG. 2. The holders support the articles radially whilst the dies are closed and the ends of the articles are trimmed by operation of the punches. Articles to be trimmed are delivered to the conveyor 24 at a point where it passes around the upper pulley wheel 26.

The construction of the punch and die arrangement for trimming the flanged ends of the articles is shown in greater detail in FIGS. 3 and 4. Each punch 35 comprises a punch head 36 supported on a cylindrical shaft 37. The punch head 36 is bolted to the shaft 37 and has mounted thereon a cutting ring 38 contoured in accordance with the radially inner portion of the flanged end of a tubular article to be trimmed and providing a cutting edge 39 which cooperates with a cutting edge 40 provided on the die segments 41 and 42 to sever the flange of the article A when the punch 35 is advanced. The two segments 41 and 42 of the die are urged radially along guide bars 43 into their closed, die forming position, by means of the cams 16 and against the action of springs 44. The cam surfaces of the cams bear on cam follower rollers 45 carried by the die segments as shown in FIG. 4.

Each punch 35 is mounted for reciprocal motion along its axis and is supported in a cylindrical bearing sleeve 50. Each punch is reciprocated by means of a cam 51 (see FIG. 5) mounted on the respective camshaft 9 and 14 and acting against a return spring 70. The cams 51 are followed by rollers 71 mounted on the ends of the punch shafts 37.

A clamping ring 52 is mounted to slide on the shaft 37 and is urged towards the punch head 35 by means of a compression spring 53. The clamping ring 52 is provided with an annular extension or nose 54 which engages in a corresponding groove 55 formed in the segments 41 and 42 when the die is closed and the punch is advanced. The clamping ring holds the segments of the die securely together and retains the punch and die in correct alignment while the flanged end of the article A is being trimmed.

A flange support and ejection ring 60 is mounted for sliding movement on the punch head 35 under the action of a compression spring 61 and serves to support the radially outer portion of the flanged end of the article during the trimming operation. Advance of the punch 35 beyond the position shown on the left in FIG. 3 causes the cutting edges 39 and 40 cooperate to sever, and thus trim the flanged end at a required diameter.

The operation of the apparatus is as follows. With both dies in their open position and with both punches retracted as shown on the right-hand side of FIG. 3, one of the tubular articles A is delivered by the conveyor 24 and supported by the holders 30 at the work station axially in line with the punches. The die segments 41 and 42 of each of the dies 3 and 4 are brought together under the action of the cams 16 until an internal cylindrical surface 80 on the die segments comes into sliding contact with an external surface 81 on the punch head 35 at the same time as the die segments come into contact with one another. At this stage there is an axial clearance between the clamping ring 52 and the die segments.

After both dies 3 and 4 have been closed the punch 35 of the first punch assembly 1 is advanced by operation of the respective cam 51 to the position shown on the left in FIG. 3 where the annular nose 54 of the clamping ring becomes engaged in the groove 55 on the die as explained above.

Further advancing movement of the punch 35 beyond the position shown on the left in FIG. 3 causes severance, or trimming, of the flanged end of the article between the cutting edges 39 and 40, after which the punch is moved by the respective spring 70 (FIG. 5) to its retracted position, that is, the position depicted on the right hand side of FIG. 3, in which it is clear of the respective die 34.

The ejection ring 60 provides axial restraint and location for the flanged end during the trimming operation and afterwards, while the punch continues its advance for a short distance sufficient to ensure severance and then returns, holding the trimmed ring of plastics material resiliently against the respective die 3, 4 to prevent it from fouling the punch while the latter is in movement. After retraction of the punch the die preferably remains held closed by its respective cams 16, so that the trim ring continues to be held captive within the die; furthermore, the die provides radial restraint for the trimmed end of the tubular article during the trimming operation which is subsequently to be performed on the other end.

It is to be understood that, in order to effect trimming, the flanged end being trimmed is required to move with the punch 35 through a small distance, the die 3 or 4 being stationary. In order to accommodate this movement the holders 30 are arranged to permit a limited bodily axial movement of the article A in each direction, and a small difference, e.g. 1/16th of a revolution, is introduced between the angular positions of the cams 51 on their camshafts 9, 14 so that the trimming operations are performed sequentially; the article A therefore moves axially in one direction and then the other as the trimming operations are carried out. To minimise the overall time duration required for trimming, the advancing movement of the second punch 35 is overlapped in time relation with the retraction of the first punch.

The trimming operation upon the second flanged end of the article A is performed in an identical way to the first, the article moving axially back through its holders 30 to its original axial position. After the second trimming operation has been completed and the associated punch retracted, the dies 3, 4 are simultaneously allowed by their respective cams 16 to open under the action of their compression springs 44. The rings of plastics material trimmed from the flanged ends are thereby released, and drop from the apparatus to a suitable discharge receptacle or conveyor for the subsequent recycling if desired. The trimmed article A is removed from the work station by the next indexing movement of the conveyor 24, and subsequently released from the holders 30 for discharge from the apparatus by suitable means.

It will be understood from the foregoing that the dies 3, 4 are fixed in axial position and their relative spacing can be accurately set and maintained in relation to the length of the article A so as to achieve trimming within closely defined limits. In addition, the closing movements of the dies and the advancing movements of the punches 35 to their operative positions are achieved by a common drive system which substantially obviates any risk of maloperation or loss of synchronisation once the apparatus has been properly set up. Applicants accordingly believe that the apparatus shown and described will be capable of trimming the tubular articles A reliably at high rates of production and with good accuracy.

Although specifically described in relation to the trimmnng of plastics articles, the invention may be applied to the trimming of the outwardly flanged ends of tubular articles of metal and other non-plastics maerials.

I claim:

1. A method of trimming the ends of a tubular article which is outwardly flanged at both ends, which comprises:
   (a) supporting the article by engagement with its exterior surface between the said flanged ends, so as to leave the flanged ends freely projecting and in such a way that the article is able to undergo limited axial movement along a predetermined path;
   (b) closing a respective segmented die around each flanged end by relative movement of the die segments in a plane perpendicular to the said predetermined path, so as to form a cutting edge peripherally engageable with the respective flanged end at the said exterior surface of the article;
   (c) advancing a first punch having a cutting edge against one of the flanged ends at the interior surface of the article and, by moving it along said predetermined path, causing it to trim the flanged end to a desired dimension by cooperation of its cutting edge with that of the respective die and to move the flanged end, with the article as a whole, along said predetermined path in the direction of its movement.
   (d) retracting the first punch;
   (e) advancing a second punch having a cutting edge against the other flanged end at the interior surface of the article and, by moving it along said predetermined path, causing it to trim the other flanged end to a desired dimension by cooperation of its cutting edge with that of the respective die and to return the flanged end, with the article as a whole, along the said predetermined path in the direction opposite to the first said direction of movement; and
   (f) retracting the second punch and opening the dies to free the article and the trimmed portions of the article therefrom.

2. A method as claimed in claim 1, wherein the retraction of the first punch and the advancement of the second punch occur at least partially simultaneously.

3. Apparatus for trimming the ends of a tubular article which is outwardly flanged at both ends which comprises for each said flanged end, a die and a punch having respective cutting edges capable of trimming the flanged end to a desired dimension by mutual cooperation through the article wall, the die being comprised of a plurality of segments which are relatively movable between a separated position at which the flanged end may be inserted between them and a closed, die-forming position at which the cutting edge may operatively engage the flanged end at the generally exterior surface of the article, and the punch being movable axially of the article when the die is closed, from a retracted position in which it is spaced from the article to an operative position in which it performs the trimming operation on the respective flanged end by cooperation with the die, the said axial movements of the two punches to achieve trimming of the respective flanged ends being each accompanied by an axial movement of the flanged end in the same direction as the punch, and drive means being provided and arranged for operating the punches in timed relation such that the axial movements of the flanged ends are accommodated by sequential and axial bodily movements of the article in opposite directions.

4. Apparatus as claimed in claim 3, wherein the punches are mounted for movement along a predetermined common linear path, and the segments of each die are mounted for movement between their separated and closed positions in a plane which is perpendicular to the said linear path.

5. Apparatus as claimed in claim 4, wherein each die has two segments arranged to make equal and opposite movements along a path perpendicular to the said linear path.

6. Apparatus as claimed in claim 4, wherein the punches and the die segments have associated cams and cam followers arranged for moving them to their operative and closed positions respectively.

7. Apparatus as claimed in claim 5, wherein the punches and the die segments have associated cams and cam followers arranged for moving them to their operative and closed positions respectively.

8. Apparatus as claimed in claim 7, wherein the cams are mounted on a plurality of interconnected camshafts arranged to be driven from a common motor at a common rotational speed, in order to effect the said operation of the punches in timed relation the respective cams being disposed at different angular positions in relation to their respective camshafts.

9. Apparatus as claimed in claim 6, which includes a plurality of springs effective upon the punches and the die segments to bias them resiliently towards their retracted and separated positions respectively.

10. Apparatus as claimed in claim 4 or claim 5, wherein the cams are mounted on a plurality of interconnected camshafts arranged to be driven from a common motor at a common rotational speed, in order to effect the said operation of the punches in timed relation the respective cams being disposed at different angular positions in relation to their respective camshafts.

11. Apparatus as claimed in claim 10, wherein the angular positions of the said respective cams on their camshafts differ by approximately 1/16th of a revolution of the camshafts.

* * * * *